United States Patent [19]

Van Meurs

[11] Patent Number: 4,684,851
[45] Date of Patent: Aug. 4, 1987

[54] DC/AC CONVERTER FOR FEEDING A METAL VAPOR DISCHARGE TUBE

[75] Inventor: Johannes M. Van Meurs, Eindhoven, Netherlands

[73] Assignee: U.S. Philips Corporation, New York, N.Y.

[21] Appl. No.: 756,412

[22] Filed: Jul. 18, 1985

[30] Foreign Application Priority Data

Jul. 26, 1984 [NL] Netherlands ............... 8402351

[51] Int. Cl.[4] .......................................... H05B 41/24
[52] U.S. Cl. ............................... 315/224; 315/223;
315/226; 315/210; 315/239; 315/287;
315/DIG. 7; 363/78; 363/97
[58] Field of Search ............. 315/DIG. 7, 224, 223,
315/287, 226, 239, 214, 210, 217, 219, DIG. 5;
363/132, 78, 97

[56] References Cited

U.S. PATENT DOCUMENTS

| 4,375,608 | 3/1983 | Kohler | 315/DIG. 7 |
| 4,388,561 | 6/1983 | Koshimura et al. | 315/DIG. 7 |
| 4,388,565 | 6/1983 | Rividi | 315/DIG. 7 |
| 4,525,648 | 6/1985 | De Bijl et al. | 315/224 |
| 4,544,862 | 10/1985 | Yamazaki et al. | 315/DIG. 7 |
| 4,572,988 | 2/1986 | Handler et al. | 315/DIG. 7 |

Primary Examiner—Palmer C. DeMeo
Assistant Examiner—Michael Razavi
Attorney, Agent, or Firm—Robert T. Mayer; Bernard Franzblau

[57] ABSTRACT

A DC/AC converter (30 to 72) for feeding a low-pressure mercury vapor discharge tube (15) comprises two series-connected main transistors (11 and 20) which, in the operating condition, are alternately conducting. The conduction times of the two transistors (11 and 20) are always kept equal to each other by means of an auxiliary circuit (70 to 72, 32a, 32b, 32c) which influences the operation of a timing circuit (32, 33). This prevents the occurrence cataphoresis in the lamp.

11 Claims, 1 Drawing Figure

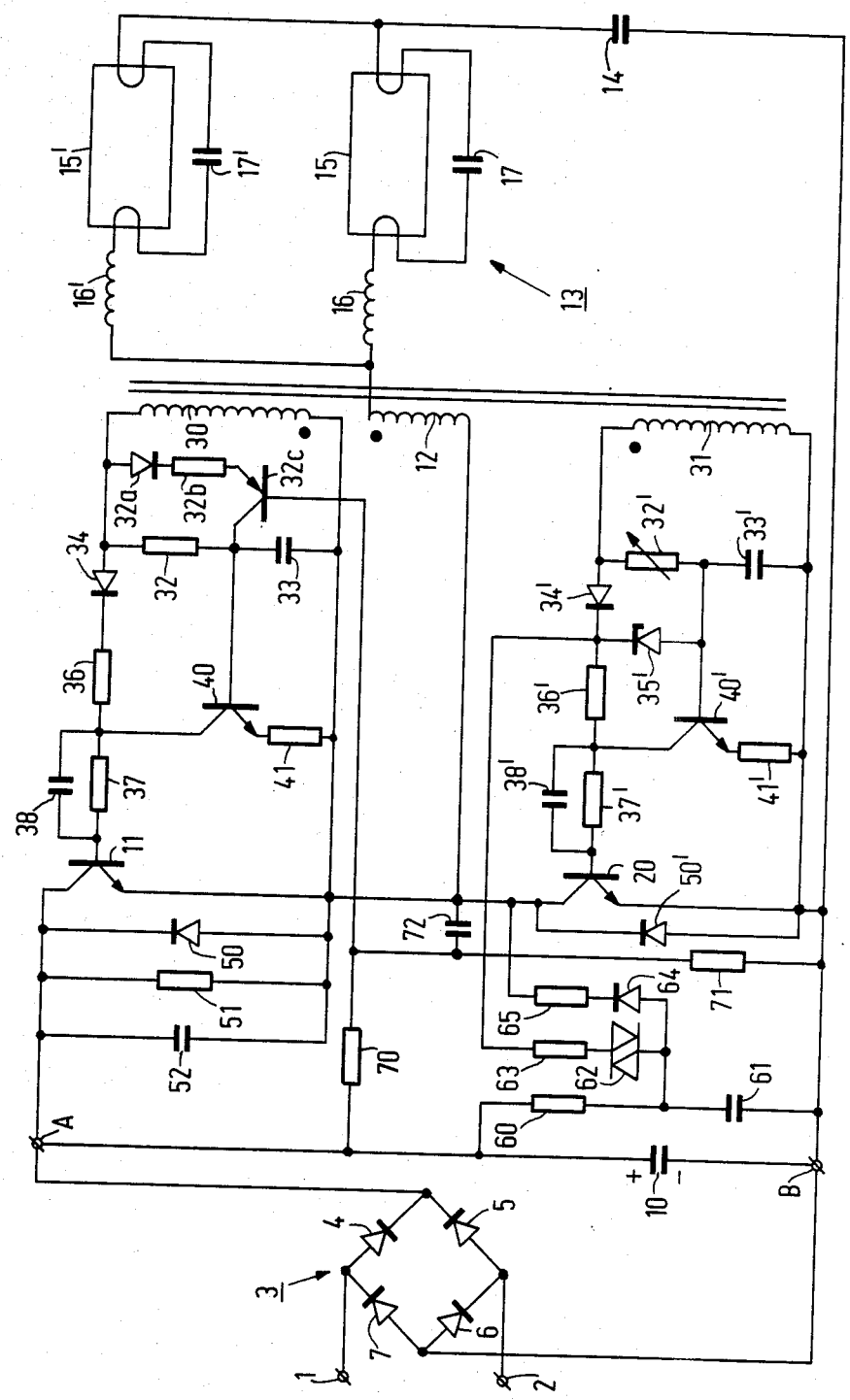

DC/AC CONVERTER FOR FEEDING A METAL VAPOR DISCHARGE TUBE

BACKGROUND OF THE INVENTION

This invention relates to a DC/AC converter for energizing a metal vapour discharge tube, in which the converter has two input terminals which are interconnected by means of a first series-combination of a first transistor, a load circuit which—in the operating condition—comprises the discharge tube, a primary winding of a transformer and a first capacitor. The load circuit together with the primary winding of the transformer and the first capacitor are shunted by a second transistor. A first secondary winding of the transformer forms part of a control circuit of the first transistor, while a second secondary winding of the transformer forms part of a control circuit of the second transistor. A combination of an auxiliary capacitor, an auxiliary transistor and a first timing circuit is provided to level the conduction times of the first and second transistors, a main electrode of the auxiliary transistor being connected to a junction between the first transistor and the second transistor.

A known DC/AC converter of the kind mentioned is described, for example, in U.S. Pat. No. 4,429,359. The converter described therein is a frequency converter of the bridge type. A disadvantage of this known DC/AC converter is that individual differences between the first and second transistor as to the time duration of the dissipation of charge carriers ("storage time") are not levelled when these transistors become non-conducting. This means that in general one transistor will always conduct for a slightly longer time than the other transistor. When energizing the afore-mentioned metal vapour discharge tube, this leads inter alia to a displacement of the metal participating in the discharge to one of the electrodes of the tube (cataphoresis). Thus, the irradiation of this discharge tube is adversely affected.

SUMMARY OF THE INVENTION

The invention has for an object to provide a DC/AC converter of the aforementioned kind in which, in the operating condition, the conduction times of the first and the second transistor are equalized substantially completely by means of a simple electric circuit, even if the two transistors exhibit individual differences in the time duration of the dissipation of charge carriers when they become non-conducting.

A DC/AC converter according to the invention for energizing a metal vapour discharge tube, comprises two input terminals which are interconnected by means of a first series-combination of a first transistor, a load circuit which—in the operating condition—comprises the discharge tube, a primary winding of a transformer and a first capacitor. The load circuit, together with the primary winding of the transformer and the first capacitor, are shunted by a second transistor. A first secondary winding of the transformer forms part of a control circuit of the first transistor and a second secondary winding of the transformer forms part of a control circuit of the second transistor. A combination of an auxiliary capacitor, an auxiliary transistor and a first timing circuit is provided to equalize the conduction times of the first and the second transistor. A main electrode of the auxiliary transistor is connected to a junction between the first transistor and the second transistor. The invention is characterized in that the first and the second secondary winding of the transformer interconnect the base and a main electrode of the relevant first and second transistors, respectively, and in that the input terminals are interconnected by means of a voltage divider, a tapping of which is connected on the one hand via the auxiliary capacitor to the junction between the first transistor and the second transistor and on the other hand to the base of the auxiliary transistor. The main electrode circuit of the auxiliary transistor is connected parallel to a part of the first timing circuit which is included in the control circuit of one of the two transistors.

The invention is based, inter alia on the idea that the auxiliary capacitor be connected in the electric circuit in a manner such that any differences in the conduction times of the first and the second transistors cause the auxiliary capacitor to be charged. This charging then influences the state of conduction of the auxiliary transistor connected to the auxiliary capacitor. This in turn leads to a different operation of the timing circuit connected to this auxiliary transistor in a manner such that the conduction time of the relevant transistor is made equal to that of the other transistor.

It should be noted that it is known per se for the first (or the second) secondary winding of a transformer to interconnect the base and a main electrode of the relevant first and second transistor, respectively (c.f. U.S. Pat. No. 4,525,648). An advantage of these connections is that the two transistors are continuously controlled so that the influence of any interference pulse has a duration generally substantially not exceeding that of the interference pulse itself.

In a preferred embodiment of a DC/AC converter according to the invention, the main electrode circuit of the auxiliary transistor is connected parallel to a resistor of the first timing circuit and this timing circuit further comprises a capacitor. This timing circuit is connected between the ends of that secondary winding of the transformer which forms part of the same control circuit.

An advantage of this preferred embodiment is that feeding the timing circuit, in the control circuit of one of the transistors, and influencing this timing circuit by means of the auxiliary transistor are then very simple. The auxiliary transistor can then in fact be made to conduct for a short time during each cycle of the alternating voltage through the relevant secondary winding of the transformer. The duration of this periodic conduction will be dependent, inter alia, upon the voltage at the auxiliary capacitor. Thus, the conduction time of the (main) transistor connected to this control circuit can be readjusted without the use of a large number of circuit elements.

In a further preferred embodiment of a DC/AC converter according to the invention, the control circuit, which is free from a parallel connection including the auxiliary transistor, has a second timing circuit with a time constant that is variable.

An advantage of this preferred embodiment is that the power consumption of the discharge tube can be varied by a variation of the time constant of the second timing circuit. If the discharge tube is in the form of a lamp, this means, for example, that the lamp can be dimmed. The conduction time of both the first and of the second transistor is then varied, of course. However, in the dimming operation too the conduction times of the first and the second transistor will substantially not differ from each other. This means that these differences will not lead to cataphoresis. This in turn is due to the operation of the aforementioned auxiliary capacitor and auxiliary transistor.

BRIEF DESCRIPTION OF THE DRAWING

An embodiment of the invention will be described more fully with reference to the accompanying drawing. This drawing shows an electric circuit of a DC/AC converter according to the invention and a feeding device for this converter as well as two metal vapour discharge lamps connected to the converter.

DESCRIPTION OF THE PREFERRED EMBODIMENTS

It should be noted that the main current circuit is generally similar to that shown in the drawing of the aforementioned U.S. Pat. No. 4,525,648. The differences mainly relate to the control circuits of the two main transistors (11 and 20).

The feeding device comprises two input terminals 1 and 2 intended to be connected to an alternating voltage source. A rectifier bridge 3 comprising four diodes (4 to 7) is connected to these terminals 1 and 2. A filter (not shown) may be arranged between the terminals 1 and 2 on the one hand and the bridge 3 on the other hand. An output terminal of the rectifier bridge 3 is connected to a first input terminal A of the converter. The other (second) output terminal of the rectifier bridge 3 is connected to a second input terminal B of the converter.

The converter will now be described. The terminals A and B are interconnected through a capacitor 10 and also through a series-combination of a first transistor 11, a primary winding 12 of a current transformer, a load circuit 13, the details of which follow hereinafter, and a capacitor 14.

The load circuit 13 comprises two substantially equal impedance parallel branches. Each of these branches comprises a low-pressure mercury vapour discharge tube 15 and 15', respectively, of about 50 W connected in series with a reactive circuit element 16 and 16', respectively, in the form of a coil. Each of the lamps has two preheatable electrodes. The ends remote from the energy supply of the lamp electrodes are interconnected through a capacitor 17 and 17', respectively.

The series-combination of the primary winding 12 of the transformer, the load circuit 13 and the capacitor 14 is shunted by a second transistor 20. Each of the two transistors 11 and 20 is of the npn-type. In the circuit the collector of the transistor 11 is connected to the positive input terminal A of the converter. The emitter of this transistor 11 is connected to the collector of the transistor 20. The emitter of the transistor 20 is connected to the negative input terminal B of the converter.

The current transformer with primary winding 12 has two secondary windings 30 and 31. The secondary winding 30 forms part of a control circuit for the transistor 11. The secondary winding 31 forms part of a control circuit for the transistor 20. The ends of the secondary winding 30 are interconnected through a first timing circuit comprising a series-combination of a resistor 32 and a capacitor 33. The resistor 32 of this timing circuit is shunted by a series-combination of a diode 32a, a resistor 32b and the main electrode circuit of a pnp-auxiliary transistor 32c. A timing circuit consisting of a variable resistor 32' and a capacitor 33' is connected to the ends of the secondary winding 31. Furthermore, a series-combination of a diode 34' and a Zener diode 35' shunt the resistor 32'. A diode 34 is connected to the resistor 32 and through a series-combination of two resistors 36, 37 to the base of the transistor 11. The resistor 37 is shunted by a capacitor 38. A transistor 40 of the npn-type is connected between a junction between the resistors 36 and 37 on the one hand and a resistor 41 on the other hand. The resistor 41 is connected to the emitter of the transistor 11. A junction between the resistor 32 and the capacitor 33 is connected to the base of the auxiliary transistor 40. Corresponding circuit elements are provided in the control circuit of the transistor 20, and are designated with accented referenced numerals.

A diode 50 is connected anti-parallel to the transistor 11. A diode 50' is connected anti-parallel to the transistor 20. The transistor 11 is further shunted by both a resistor 51 and a capacitor 52.

A circuit for starting the converter is further provided. This circuit comprises inter alia a series-combination of a resistor 60 and a capacitor 61 shunting the capacitor 10. A junction between the resistor 60 and the capacitor 61 is connected to a bidirectional breakdown element (Diac) 62. The other side of this breakdown element 62 is connected through a resistor 63 to a junction between the resistor 36' and the diode 34' of the control circuit of the transistor 20. The junction between the resistor 60 and the capacitor 61 is further connected to a diode 64. The other side of this diode 64 is connected through a resistor 65 to the collector of the transistor 20.

Finally, according to the invention, the input terminals A and B of the DC/AC converter are interconnected by means of a voltage divider comprising two resistors 70 and 71. A tapping between these resistors is connected both to the base of the auxiliary transistor 32c and to an auxiliary capacitor 72. The other side of the auxiliary capacitor 72 is connected to a junction between the first transistor 11 and the second transistor 20.

It follows from the Figure that the junction between the two transistors (11, 20) is connected through the winding 30 and the circuit elements 32a and 32b to the emitter of the auxiliary transistor 32c.

The circuit described operates as follows: The terminals 1 and 2 are connected to an alternating voltage of, for example, about 220 V, 50 Hz. Consequently, a direct voltage is applied via the rectifier bridge 3 between the terminals A and B of the converter. Thus, current will first flow from A via the resistor 51, the primary winding 12 of the current transformer, the load circuit 13 and the capacitor 14 to the terminal B, as a result of which the capacitors 17, 17' and 14 are charged. Furthermore, the capacitor 61 will be charged via the resistor 60. When the threshold voltage of the breakdown element 62 is then reached, the capacitor 61 will be discharged via, inter alia, the resistors 63, 36' and 37' and the base-emitter junction of the transistor 20. This discharge ensures that the transistor 20 becomes conductive for the first time. Consequently, inter alia the capacitor 14 will be discharged in the circuit 14, 13, 12, 20, 14. Since this discharge current also flows through the primary winding 12 of the current transformer, voltages are induced in the two secondary windings 30 and 31. The induced voltage in the winding 31 has a direction which keeps the transistor 20 conducting. The timing circuit 32' to 35' will render the auxiliary transistor 40' conducting after a given time. As a result, the transistor 20 will become non-conducting inter alia by means of the capacitor 38'. The current in the load circuit 13 then flows through the parallel combination of the diode 50 and the capacitor 52 and through the capacitor 10 back to the capacitor 14. The instantaneous value of the current decreases and the transistor 11 is rendered conducting near its zero passage by means of the winding 30, the diode 34 and the resistors 36 and 37. In a manner similar to that described for the switching procedure of the transistor 20, after some time the transistor 11 is again rendered nonconducting. The converter has now started. The transistors 11 and 20 are now alternately rendered conducting. The circuit 64, 65 then ensures that the starting circuit 62, 63 becomes inoperative.

The combination, according to the invention, of the voltage divider 70, 71 with the auxiliary capacitor 72 and the auxiliary transistor 32c now ensures that the control of the first transistor 11 always follows that of the second transistor 20. This is due to the fact that with unequal conduction times of the two transistors 11 and 20, the auxiliary capacitor 72 is charged, which influences the state of conduction of the auxiliary transistor 32c. In fact the duration of the conduction time of this auxiliary transistor 32c varies per cycle of the alternating voltage across the secondary winding 30. Thus, the operation of the timing circuit 32, 33 is changed, as a result of which the conduction time of the first transistor 11 is readjusted.

Although the converter now has started, the lamps 15 and 15' are not yet ignited. The load circuit 13 in this case comprises a parallel-combination of two substantially identical branches each comprising a series-combination of a coil 16 and a capacitor 17 (and 16' and 17', respectively). A damping of this circuit by the lamps is then not yet provided. Without the presence of the Zener diode 35', the frequency of the current through the load circuit 13 would be practically adjusted to the resonance frequency of this circuit, as a result of which such high voltages would be applied across the lamps 15 and 15' that these lamps would ignite with cold electrodes.

However, upon the increase of the current in the primary winding 12 of the transformer during starting, a fairly high voltage is now induced already in inter alia the secondary winding 31, which ensures that the Zener voltage of the Zener diode 35' is reached. Thus, in fact, the (voltage-dependent) time constant of the timing circuit 32' to 35' is influenced, i.e. by the fact that the resistor 32' is shunted by the circuit comprising the then conducting Zener diode 35'. The result is that the voltage at the capacitor 33' more rapidly reaches the value at which the transistor 40' becomes conducting. As a result of the combination of the capacitor 38' and the transistor 40' renders the relevant main transistor 20 more rapidly non-conducting. This leads to the frequency of the converter reaching a higher value. This higher frequency results in a larger voltage across the coils 16 and 16', and hence in a smaller voltage across the lamps 15 and 15', respectively. Thus, the electrodes of the lamps can be preheated via the capacitors 17 and 17'. Consequently, there is no risk that the lamps ignite with too cold electrodes. It is not until the electrodes are preheated sufficiently that the voltage across the lamps is sufficient to ignite these lamps. The current through the load circuit and hence through the primary winding 12 of the current transformer will then no longer be liable to assume a high value because now damping is provided by the lamps. This leads to the voltages induced in the winding 31 being comparatively small so that the Zener voltage of the Zener diode 35' is no longer reached. This means that the process of charging the capacitor 33' takes more time, as a result of which the transistor 40' is rendered conducting only at a later instant. As a result, also the main transistor 20 will be rendered non-conducting only at a later stage by the combination of the capacitor 38' and the auxiliary transistor 40'. The control device of the transistor 11 follows the operation of the control device of the transistor 20. This means that the frequency at which the converter then will operate is lower than that during the ignition process of the lamp.

Any difference in storage time between the transistors 11 and 20 also leads to a different voltage at the auxiliary capacitor 72 so that this difference is also taken into account when equalizing the conduction times of the transistors 11 and 20.

The power consumption of the lamps 15 and 15' can be varied (the lamps can be dimmed, for example) by varying the variable resistor 32'.

Also in this case, the combination of the circuit elements 70 to 72 and 32' always keeps the varying conduction times of the two transistors 11 and 20 practically equal to one another.

In a practical embodiment, the circuit elements have the values indicated in the table below.

Table

| | |
|---|---|
| Capacitor 10 about | 68 μFarad |
| Capacitor 14 about | 0.5 μFarad |
| Capacitor 17 and 17' each about | 12 nanoFarad |
| Capacitor 33 and 33' each about | 47 nanoFarad |
| Capacitor 38 and 38' each about | 10 μFarad |
| Capacitor 52 about | 3.3 nanoFarad |
| Capacitor 61 about | 100 nanoFarad |
| Capacitor 72 about | 15 nanoFarad |
| Coil 16 and 16' each about | 2 mHenry |
| Transmission ratio of the current transformer (12; 30, 31) about | 1 to 5, to 5 |
| Resistor 32 about | 1.2 kOhm |
| Resistor 32b about | 390 Ohm |
| Resistor 36 and 36' each about | 22 Ohm |
| Resistor 37 and 37' each about | 100 Ohm |
| Resistor 41 and 41' each about | 0.47 Ohm |
| Resistor 51 about | 1 MOhm |
| Resistor 60 about | 680 kOhm |
| Resistor 63 about | 100 Ohm |
| Resistor 65 about | 10 kOhm |
| Resistor 70 about | 487 kOhm |
| Resistor 71 about | 562 kOhm |

The ohmic value of the (variable) resistor 32' in this embodiment is always smaller than that of the resistor 32. This smaller ohmic value would in fact lead to a conduction time of the transistor 11 which is longer than that of the transistor 20. Thus, the electrode of the auxiliary capacitor 72 facing the tapping of the voltage divider would be given a more negative potential with respect to its other electrode. By the fact that the auxiliary transistor 32c then becomes conducting, the timing circuit 32, 33 is influenced in a manner such that the time constant becomes smaller. As a result, the transistor 40 becomes more rapidly conducting and hence the transistor 11 becomes more rapidly non-conducting so that then the conduction times of the transistors 11 and 20 are levelled.

The resistors 70 and 71 are slightly unequal in order to obtain a positive bias voltage at the electrode of the auxiliary capacitor 72 facing the tapping of the voltage divider 70, 71 with respect to its other electrode. Thus, in the operating condition the influence of the voltage across the secondary winding 30 on the duration of the conduction of the auxiliary transistor 32c is fixed.

Instead of resistors 32 and 32' having different maximum ohmic values, use could alternatively be made of two resistors having the same ohmic value, but the transistor 11 could then be a transistor having a longer storage time than that of the transistor 20.

The operating voltage of the lamps 15 and 15' is about 145 V.

The starting frequency of this converter is about 40 kHz. The operating frequency, i.e. the frequency in the case of ignited undimmed lamps 15 and 15', is about 25 kHz.

An advantage of the converter described is that the lamps 15 and 15' do not exhibit cataphoresis because the conduction time of the transistor 11 is always kept equal to that of the transistor 20.

What is claimed is:

1. A DC/AC converter for energizing a discharge tube comprising: two input terminals connected to a first series-combination of a first transistor, a load circuit comprising-in the operating condition—the discharge tube, a primary winding of a transformer and a first capacitor, the load circuit together with the transformer primary winding and the first capacitor being shunted by a second transistor, a first secondary winding of the transformer forming part of a control circuit for the first transistor, a second secondary winding of the transformer forming part of a control circuit for the second transistor, a combination of an auxiliary capacitor, an auxiliary transistor and a first timing circuit provided to equalize the conduction times of the first and the second transistor, a main electrode of the auxiliary transistor being connected to a junction between the first transistor and the second transistor, characterized in that the first and the second secondary windings of the transformer interconnect the base and a main electrode of the relevant first and second transistors, respectively, means connecting the input terminals to a voltage divider having a tapping connected via the auxiliary capacitor to the junction between the first transistor and the second transistor and to the base of the auxiliary transistor, and means connecting the main electrode circuit of the auxiliary transistor parallel to a part of the first timing circuit which is included in the control circuit of one of the two transistors.

2. A DC/AC converter as claimed in claim 1, characterized in that the main electrode circuit of the auxiliary transistor is connected parallel to a resistor of the first timing circuit, and in that the timing circuit further comprises a capacitor said timing circuit being connected between the ends of that secondary winding of the transformer which forms part of the same circuit.

3. A DC/AC converter as claimed in claim 1 or 2, characterized in that the control circuit, which is free from a parallel connection including the auxiliary transistor, comprises a second timing circuit, the time constant of the second timing circuit being variable.

4. A DC/AC converter as claimed in claim 1 further comprising a second timing circuit included in the control circuit of the other one of the two transistors, the time constant of the second timing circuit being variable.

5. A ballast-inverter circuit for energizing an electric discharge lamp comprising: a pair of input terminals for a source of voltage, a transformer having a primary winding and first and second secondary windings, first and second transistors each having a control electrode, means connecting said first and second transistors in series circuit across said input terminals, a load circuit which—in the operating condition—includes the discharge lamp, means serially connecting the transformer primary winding, the load circuit and a first capacitor in shunt with one of said transistors, first and second control circuits coupling said first and second secondary windings to the control electrodes of the first and second transistors, respectively, so as to alternately drive the transistors into conduction, each of said control circuits including a timing circuit energized by its respective secondary winding so as to be responsive to the current in the transformer primary winding, and an auxiliary capacitor connected in the circuit so as to develop a voltage determined by a difference in the conduction periods of the first and second transistors and coupled to one of said timing circuits to adjust the timing thereof in a sense to equalize the conduction periods of the first and second transistors.

6. A ballast-inverter circuit as claimed in claim 5 wherein the other one of said timing circuits includes a variable impedance element that can be manually adjusted for dimming a lamp in the operating condition.

7. A ballast-inverter circuit as claimed in claim 5 further comprising: a voltage divider connected to said input terminals, an auxiliary transistor coupled to one of said timing circuits so as to influence the timing of said timing circuit, means coupling a control electrode of the auxiliary transistor to a tap on the voltage divider, said auxiliary capacitor being coupled between said voltage divider tap and a junction between said first and second transistors.

8. A ballast-inverter circuit as claimed in claim 7 wherein said one timing circuit comprises a serially connected resistor and capacitor coupled to its respective secondary winding, and wherein the auxiliary transistor is connected in parallel with said timing circuit resistor.

9. A ballast-inverter circuit as claimed in claim 5 wherein said load circuit includes an inductor for connection in series with the discharge lamp, and the other one of the timing circuits includes a voltage-dependent switching element that switches in response to a given voltage induced in its secondary winding by current flow in the transformer primary winding thereby to alter a parameter of the other timing circuit so as to adjust the inverter to operate at a first high frequency prior to ignition of the lamp and subsequently to adjust the inverter to operate at a second high frequency lower than the first high frequency in the operating condition of a connected lamp.

10. A ballast-inverter circuit as claimed in claim 5 further comprising: an auxiliary transistor coupled to said one timing circuit for adjusting the timing thereof, said auxiliary capacitor being coupled to said first and second transistors, to said auxiliary transistor and to a DC voltage source so as to develop a voltage across the auxiliary capacitor that is determined by a difference in the conduction periods of the first and second transistors, means connecting a control electrode of the auxiliary transistor to said voltage source, and a capacitor for coupling one main electrode of the auxiliary transistor to a junction between said first and second transistors, whereby the voltage developed across the auxiliary capacitor is operative to control said auxiliary transistor to alter the timing of said one timing circuit in a sense to maintain the conduction periods of the first and second transistors equal.

11. A ballast-inverter circuit for energizing an electric discharge lamp comprising: a pair of input terminals for a source of voltage, a transformer having a primary winding and first and second secondary windings, first and second transistors each having a control electrode, means connecting said first and second transistors in series circuit across said input terminals, a load circuit which—in the operating condition—includes the discharge lamp, means serially connecting the transformer primary winding, the load circuit and a first capacitor in shunt with one of said transistors, first and second control circuits coupling said first and second secondary windings to the control electrodes of the first and second transistors, respectively, so as to alternately drive the transistors into conduction, each of said control circuits including a timing circuit energized by its respective secondary winding so as to be responsive to the current in the transformer primary winding, means coupled to one of said timing circuits for adjusting the timing thereof, and an auxiliary capacitor coupled to said first and second transistors, to said adjusting means and to a voltage source so as to develop a voltage that is determined by a difference in the conduction periods of the first and second transistors, the voltage developed across the auxiliary capacitor being operative to control said adjusting means to alter the timing of said one timing circuit in a sense to maintain the conduction periods of the first and second transistors equal.

* * * * *